118,470

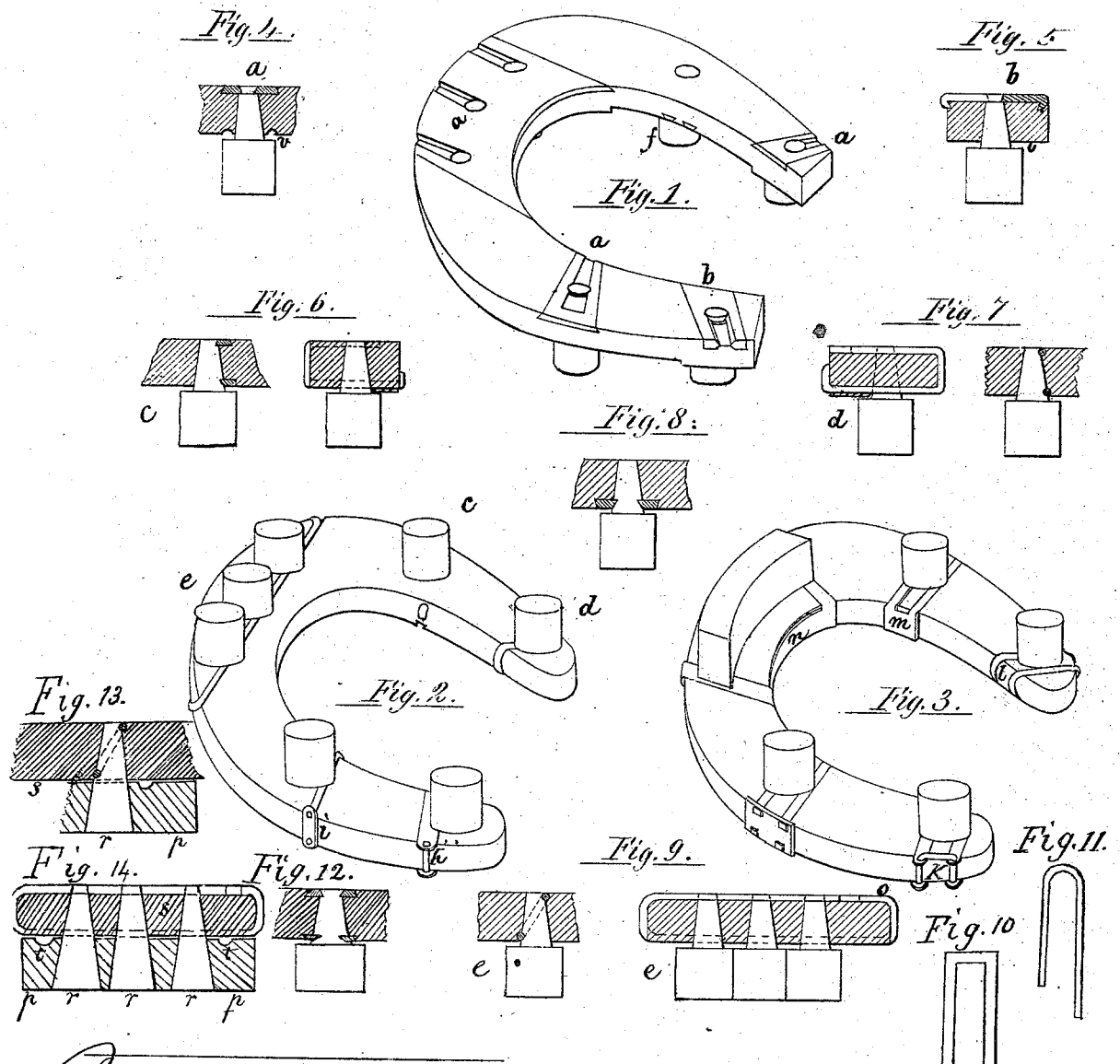

UNITED STATES PATENT OFFICE.

JOHN J. MERVESP, OF NEW YORK, N. Y.

IMPROVEMENT IN HORSESHOE-CALKS.

Specification forming part of Letters Patent No. 118,470, dated August 29, 1871.

*To all whom it may concern:*

Be it known that I, JOHN J. MERVESP, of the city, county, and State of New York, have invented a new and useful Improvement in Attaching Calks to Horseshoes; and I do hereby declare the following to be a full and exact description of the same, reference being had to the accompanying drawing forming part of this specification, in which—

Figure 1 is a perspective view of my improved horseshoe, illustrating my improved method of attaching the calks. Figs. 2 and 3 are modifications of the same. Fig. 4 is a sectional view of the plan of attaching the calks shown at $a\ a\ a$, Fig. 1. Fig. 5 is a sectional view of the plan of attaching the calks shown at $b$, Fig. 1. Fig. 6 is a transverse and longitudinal vertical section of the plan of attaching the calk shown at C, Fig. 2. Fig. 7 is a transverse and longitudinal vertical section of the plan of attaching the calk shown at $d$, Fig. 2. Fig. 8 is a sectional view of the plan of attaching the calk shown at $f$, Fig. 1. Fig. 9 is a transverse and longitudinal vertical section of the plan of attaching the calk shown at $e$, Fig. 2. Figs. 10 and 11 are plane views of the U-shaped device used to secure the calks shown in Figs. 2 and 3. Fig. 12 is a sectional view of the calk shown in Fig. 3. Figs. 13 and 14 are modifications of Fig. 9.

Similar letters of reference indicate like parts.

The object of this invention is to provide novel means for attaching calks to horseshoes without taking the shoe off the horse's hoof and detaching them while the shoe is on the horse's hoof. By this plan the cost of shoeing horses is greatly reduced any part of the year, as the calks are made sharp in frosty weather and flat in fair weather, so that they can be used all the year. The invention consists in a U-shaped fastening device in combination with a calk having a round tapering shank grooved on its opposite sides to receive said fastening. It also consists in a solid toe-calk, which is affixed to the shoe by means of tapering rivets and auxiliary fastenings, as herein set forth and shown.

In order that others skilled in the art to which my invention appertains may be able to use the same, I will proceed to describe the manner of carrying it into effect.

In the accompanying drawing, Figs. 1, 2, and 3 represent a horseshoe, the form of which may be identical with that in common use, $a\ a\ a$, $b$, and $f$, Fig. 1, and $c\ e\ d\ h\ i$, Fig. 2, with $k\ j\ l\ m\ n$, Fig. 3, representing the different forms of fastening the calks, transverse and longitudinal vertical sections of which are shown in Figs. 4, 5, 6, 7, 8, 9, 12, 13, and 14. The fastening consists of a U or staple-shaped contrivance, shown in Figs. 10 and 11, and at $a\ a\ a\ b$, Fig. 1, used in combination with a tapering grooved calk and recessed or grooved shoe, with a tapering socket fitted to hold the tapering shank of the calk. The shanks of the U-shaped fastener are secured as shown in the drawing to be hereafter referred to. A modification of this U-shaped fastener is shown at $l\ m\ n\ j\ k$, Fig. 3. In Figs. 13 and 14, in lieu of having the solid head on the calks, as shown in Fig. 9, a plate with three tapering holes is substituted, and the calk shown at $r\ r\ r$ is all one tapering shank. In order to attach this plate $p\ p$, which serves as the head of the calk, it is placed on the shoe, the tapering holes in it being in a line with the tapering sockets in the toe of the shoe; then the tapering shanks shown at $r\ r\ r$ are driven through the plate and shoe, and secured to the shoe the same as the solid calks shown at $e$, Fig. 9, and in Figs. 13 and 14. This plate or calk can be attached to the shoes shown in Figs. 1, 2, and 3, the shanks of which pass through the plate or calk being secured to the shoe the same as the shanks of the solid-headed calks and is detached in the same manner. In the shoe shown in Fig. 1 there is a tapering recess, as shown at $a\ a\ a$ and $f$, into which the U-shaped device is driven. The fastening shown at $f$, Fig. 1, is driven in the dovetailed tapering grooves in the surface of the upper side of the shoe, while at the same time its beveled edges engage with the recess in the upper part of the shank of the calk, as shown in Fig. 8, while the fastening shown at $a\ a\ a\ a$, Figs. 1 and 4, are driven into the dovetailed tapering recesses in the under side of the shoe, at the same time engaging with the grooves in the ends of the tapering shanks of the calks to keep them in their tapering sockets. Before these fasteners shown at Figs. 1 and 10 are driven into the recesses in the shoe their shanks are quite straight, but when driven into the tapering recesses in the shoe, and the grooves in the upper side and lower end of the shank of the calk shown, respectively, in Figs. 4 and 8, they conform to the position of the grooves in the shoe, which are tapering, as shown in Fig. 1, which prevent them leaving the same till driven out with a punch. The object of having the recesses in the shoe tapering and dovetailed is to keep the fastening device shown in Fig. 10 from leaving the shoe. The edges of the shank of this fastening device, shown in Fig. 10 and at $a$ in the toe of the shoe, Fig. 1, are beveled to fit the dovetailing in either side of the recess in the shoe; then, when driven into the recess, it is firmly held there and will not leave the position till driven out. The only difference between the fastening device shown in Fig. 10 and the one shown in the toe of the shoe at $a$, Fig. 1, is that the latter has three slots cut in it, the edges of which are beveled to hold the three toe-calks, while the former has only one slot in it. Both are square before being driven into the tapering recesses in the shoe, and it is the tapering of the recesses or grooves in the shoe that keeps them firmly in their proper place. The U-shaped device shown at $b$, Fig. 1, is fastened at the ends in place of the sides; it is driven into the recess in the shoe, a head being formed on one end of it previously, which fits snugly into a recess in the edge of the shoe, as shown at $b$, Fig. 5, when the other end of it is bent into the recess on the other edge of the shoe, the calk being previously placed in the socket in the shoe. The calk is held by this device the same as at $a$ $a$ $a$. In order to detach the calk shown in Fig. 1 at $a$ $a$ $a$ and $f$ it is only necessary to drive out the U-shaped fastening devices and drive a chisel between the shoulders of the calk and the shoe in the space seen at $u$, Fig. 5, which will pry the calk out of its socket, or to insert a tapering round punch in the grooves seen at $v$, Fig. 4, and pry the calk out of the shoe.

The mode of fastening the calks as shown in Fig. 2 is as follows: In lieu of having both shanks of the U-shaped fastening device on the under side or bottom, as shown at $a$ $a$ $a$ and $b$, Fig. 1, or of having both shanks on the top or face side of the shoe, as seen at $f$, one shank is placed in a groove in the bottom of the shoe, and the other in a groove in the top of the shoe after the calks are placed in their tapering sockets, when both arms of the U-shaped fastening device engage with the recesses or grooves in the calks and hold them firmly in their place after being driven in and their upper ends fastened. (I mean the ends of the U-shaped fastener, Fig. 11.) The short arm of the U-shaped fastener is placed in the groove in the bottom of the shoe (after the calk is placed in its tapering socket) and the long arm in the groove and hole in the top or upper side of the shoe, after which the end of the long arm is bent a little in order to keep itself and the calk in their proper position, as seen at $c$ and $d$, Fig. 2, a sectional view of which is seen in Figs. 6 and 7. In order to detach this calk it is only necessary to straighten the bent part of the longer arm seen bent at $c$, Fig. 2, and drive it out of the shoe when the calk is taken out as before described in Fig. 1. Another method of fastening the longer arm or shank of the U-shaped fastener as shown at $e$, Fig. 2, (a longitudinal vertical section of which is shown in Fig. 9,) is to bend the end of the arm down the edge of the shoe and then bend it into the groove in the bottom or under side of the shoe after it has been (I mean the fastener) driven into the grooves in the shoe and engaging with the recesses in the shanks of the calks, which it aids to keep in its place in conjunction with its shorter arm, which runs in the groove in the under side of the shoe and engages with the recess in the lower end of the shank of the calk, as seen in section, Fig. 9. In order to detach this fastening and the calks, the bent part shown at O, Fig. 9, is cut off or straightened out, when the fastening is driven out and the calks pried out of the shoe, as before described in reference to Fig. 1. The fastener shown at $i$, Fig. 2, is a U-shaped staple, the same as shown in Fig. 11, the only difference being that both shanks or arms are the same length. To attach a calk with this fastening the calk is placed in the tapering socket of the shoe, the recesses in the calks being placed in line with the grooves in the shoe; then the fastener is driven into the grooves in the upper and lower sides of the shoe, at the same time engaging with the grooves or recesses in the side of the shank of the calk, when a small plate with two holes, seen at $i$, is placed on the ends of the fastener and the ends bent or riveted, which keeps the calk and fastener in position. This fastening is detached by cutting the small plate or by prying it off and then punching out the fastener and removing the calk, as before described. The fastening shown at $h$, Fig. 2, is placed in the shoe, having a hole in each end of it, into which a pin is placed and the end of it bent or riveted, which keeps the calk and fastener in position. To detach this fastening and calk, the pin is either cut in the center or the bent part of it straightened and taken out of the holes, when the fastening and calk is removed, as before described. The fastening shown in Fig. 3 is just the same as that shown in Fig. 2, the only difference being that the former has two U-shaped fastening devices, singly, as seen at $l$, or joined together, as seen at $m$ $n$, running in the transverse grooves in the shoe and fastener the same as the fastening shown in Fig. 2, with this difference that the double U-fastening shown in Fig. 3 catches on both sides of the shank of the calk on top and bottom, as seen in section, Fig. 12, while the fastening shown in Fig. 2 catches only on one side of the shank of the calk top and bottom, or transversely, as seen at $e$, Fig. 9. The fastening shown at Fig. 3 is only used where there is a heavy strain on the shoe, as is the case with heavy draft-horses. The fastening shown at $l$, Fig. 3, is secured in the same manner as that shown at $c$ $d$, Fig. 2, the ends of the fastening at $n$ like that at $e$, and the ends of the fastening at $j$ $k$ like those at $i$ $h$, the only difference being that the fastenings used in Fig. 3 are double fastenings, and are attached and detached like the ones in Fig. 2. The ends of the fastening shown at $m$ are secured like the fastening shown at $a$ $f$, Fig. 1.

Having thus described my invention, what I claim as new, and desire to secure by Letters Patent, is—

1. In horseshoes, the U-shaped fastening, Figs. 10 and 11, in combination with a calk having a tapering shank grooved on its opposite sides to receive said fastening, as herein described and shown.

2. The solid toe-calk $p$, Figs. 13 and 14, formed with tapering holes in combination with tapering rivets $r\ r$, the shoe $s$ with tapering holes and fastenings for securing the rivets $r$, all constructed and arranged substantially as herein described.

JOHN J. MERVESP.

Witnesses:
BENJAMIN A. MORAN,
ED. S. HUGHES.